US008856501B2

(12) United States Patent
Hakoun et al.

(10) Patent No.: US 8,856,501 B2
(45) Date of Patent: Oct. 7, 2014

(54) METHOD AND SYSTEM FOR CONTROLLING OPERATION OF INTERCONNECTED DEVICES BY CIRCULATING HOST CAPABILITY WITHOUT A CENTRALIZED MANAGER

(75) Inventors: Eyal F. Hakoun, Kibutz Matzuba (IL); Yosi Pinto, Kfar Vradim (IL)

(73) Assignee: SanDisk Technologies Inc., Plano, TX (US)

( * ) Notice: Subject to any disclaimer, the term of this patent is extended or adjusted under 35 U.S.C. 154(b) by 911 days.

(21) Appl. No.: 12/706,519

(22) Filed: Feb. 16, 2010

(65) Prior Publication Data

US 2011/0145556 A1    Jun. 16, 2011

Related U.S. Application Data

(60) Provisional application No. 61/286,281, filed on Dec. 14, 2009, provisional application No. 61/288,078, filed on Dec. 18, 2009.

(51) Int. Cl.
| | |
|---|---|
| *G06F 9/00* | (2006.01) |
| *G06F 9/24* | (2006.01) |
| *G06F 15/177* | (2006.01) |
| *G06F 1/26* | (2006.01) |
| *G06F 1/32* | (2006.01) |

(52) U.S. Cl.
CPC ............ *G06F 1/266* (2013.01); *G06F 1/3253* (2013.01); *G06F 1/3203* (2013.01); *Y02B 60/1235* (2013.01)
USPC .......................................................... 713/1

(58) Field of Classification Search
USPC .......................................................... 713/1
See application file for complete search history.

(56) References Cited

U.S. PATENT DOCUMENTS

| | | | |
|---|---|---|---|
| 7,069,347 B1 | 6/2006 | Kolokowsky | |
| 2002/0162035 A1* | 10/2002 | Tsukihashi | 713/300 |
| 2002/0162036 A1* | 10/2002 | Kim et al. | 713/300 |
| 2002/0184481 A1* | 12/2002 | Bish et al. | 713/1 |
| 2004/0078498 A1* | 4/2004 | Saotome | 710/8 |
| 2004/0215779 A1* | 10/2004 | Weber | 709/226 |
| 2004/0221180 A1* | 11/2004 | Enami et al. | 713/300 |
| 2005/0216631 A1* | 9/2005 | Daly et al. | 710/110 |
| 2006/0129856 A1 | 6/2006 | Main et al. | |
| 2008/0294923 A1 | 11/2008 | Barake et al. | |
| 2009/0210596 A1* | 8/2009 | Furuya | 710/110 |
| 2009/0214051 A1* | 8/2009 | Lockett et al. | 381/77 |

OTHER PUBLICATIONS

International Preliminary Report on Patentability issued Jun. 28, 2012 in corresponding Appln. No. PCT/US2010/060094 (6 pgs).
U.S. Appl. No. 12/509,832, filed Jul. 27, 2009, entitled "Device Identifier Selection".

(Continued)

*Primary Examiner* — Thomas Lee
*Assistant Examiner* — Xuxing Chen
(74) *Attorney, Agent, or Firm* — Brinks, Gilson & Lione

(57) ABSTRACT

Systems and methods for automatically and controlling operation of one or more devices in a system are provided. In a particular embodiment, a command is received by a device in order for the device to determine whether to perform an operation (such as perform initialization of the device). The command may include information indicative of resource capabilities of at least a part of the system. Using the information, the device may determine whether to begin performing the operation (such as initialization), and perform the operation if it is determined to do so.

33 Claims, 10 Drawing Sheets

(56) References Cited

OTHER PUBLICATIONS

U.S. Appl. No. 12/561,122, filed Sep. 16, 2009, entitled "Device Identifier Selection".

U.S. Appl. No. 12/565,685, filed Sep. 23, 2009, entitled "Multi-Protocol Storage Device Bridge".

U.S. Appl. No. 61/234,133, filed Aug. 14, 2009, entitled "Dual Interface Card With a Backward and Forward Compatibility".

The International Search Report and the Written Opinion of the International Searching Authority issued Mar. 28, 2011 in corresponding Appln. No. PCT/US2010/060094 (9 pgs).

* cited by examiner

METHOD AND SYSTEM FOR CONTROLLING OPERATION OF INTERCONNECTED DEVICES BY CIRCULATING HOST CAPABILITY WITHOUT A CENTRALIZED MANAGER

REFERENCE TO RELATED APPLICATIONS

This application claims the benefit of U.S. Provisional Application No. 61/286,281, filed Dec. 14, 2009, and the benefit of U.S. Provisional Application No. 61/288,078, filed Dec. 18, 2009, the entirety of both of these applications are hereby incorporated by reference herein.

BACKGROUND

A system may include a host device and multiple devices in communication with the host. An example of a system configuration is depicted in FIG. 1, in which the host device uses a network topology known as a "ring". "Ring" topology is a type of network setup in which the multiple devices are connected in series, with the first device and the last device of the multiple devices being connected directly to the host device. The transmitter circuit (Tx) of the host device is connected to the receiver circuit (Rx) of Device1. The transmitter circuit (Tx) of Device1 is connected to the receiver circuit (Rx) of Device2, and this operation is repeated. The transmitter circuit (Tx) of Device N, which is the final device in the system, is connected to the receiver circuit (Rx) of the host device, thereby completing the ring connection. Other examples of system configurations include a tree topology, a star topology, a linear daisy chain topology, or a hub topology.

Prior to normal operation of the system, one or more of the multiple devices may be initialized. There are several ways in which to initialize the one or more multiple devices. One way is to sequentially initialize the multiple devices. Sequential initialization involves initializing the multiple devices one-at-a-time in series, starting with the first device (Device 1 in FIG. 1) and ending with the last device (Device N in FIG. 1). Sequential initialization has both benefits and drawbacks. This type of initialization consumes relatively low power at any single time so as not to exceed the power capability of the host device. However, because initialization is performed one device at a time, sequential initialization takes a long time.

Another way to initialize the system is parallel initialization. Parallel initialization involves initializing all of the multiple devices at once. Parallel initialization has the benefit of quick initialization. However, parallel initialization consumes relatively high power during system initialization time. In particular, each of the multiple devices consumes current during the initialization (such as 100 milliamp (mA)). The host device may include a power supply that is capable of operating during the normal operation, but incapable of performing the parallel initialization. For example, the host device may include a power supply with a 400 mA output. In the event that the system includes more than 4 devices (each requiring 100 mA during initialization), the power supply cannot initialize all of the devices in parallel. To perform the parallel initialization, the host device must have a larger power supply at a greater cost.

Accordingly, both sequential initialization and parallel initialization unduly suffer from power or time constraints.

SUMMARY

Embodiments of the present invention are defined by the claims, and nothing in this section should be taken as a limitation on those claims.

By way of example, the embodiments described below generally relate to operation of at least a part of a system (such as initialization). In one embodiment, a device in the system receives a command that includes information indicative of resource capabilities of at least a part of the system. In one embodiment, the information may comprise one or more parameters. In another embodiment, the information may comprise two or more parameters. Using the information, the device may determine whether to begin the operation (such as begin initialization), and perform the operation in response to the determination.

Other embodiments are provided, and each of the embodiments can be used alone or together in combination. Various embodiments will now be described with reference to the attached drawings.

DETAILED DESCRIPTION

Figure 1:
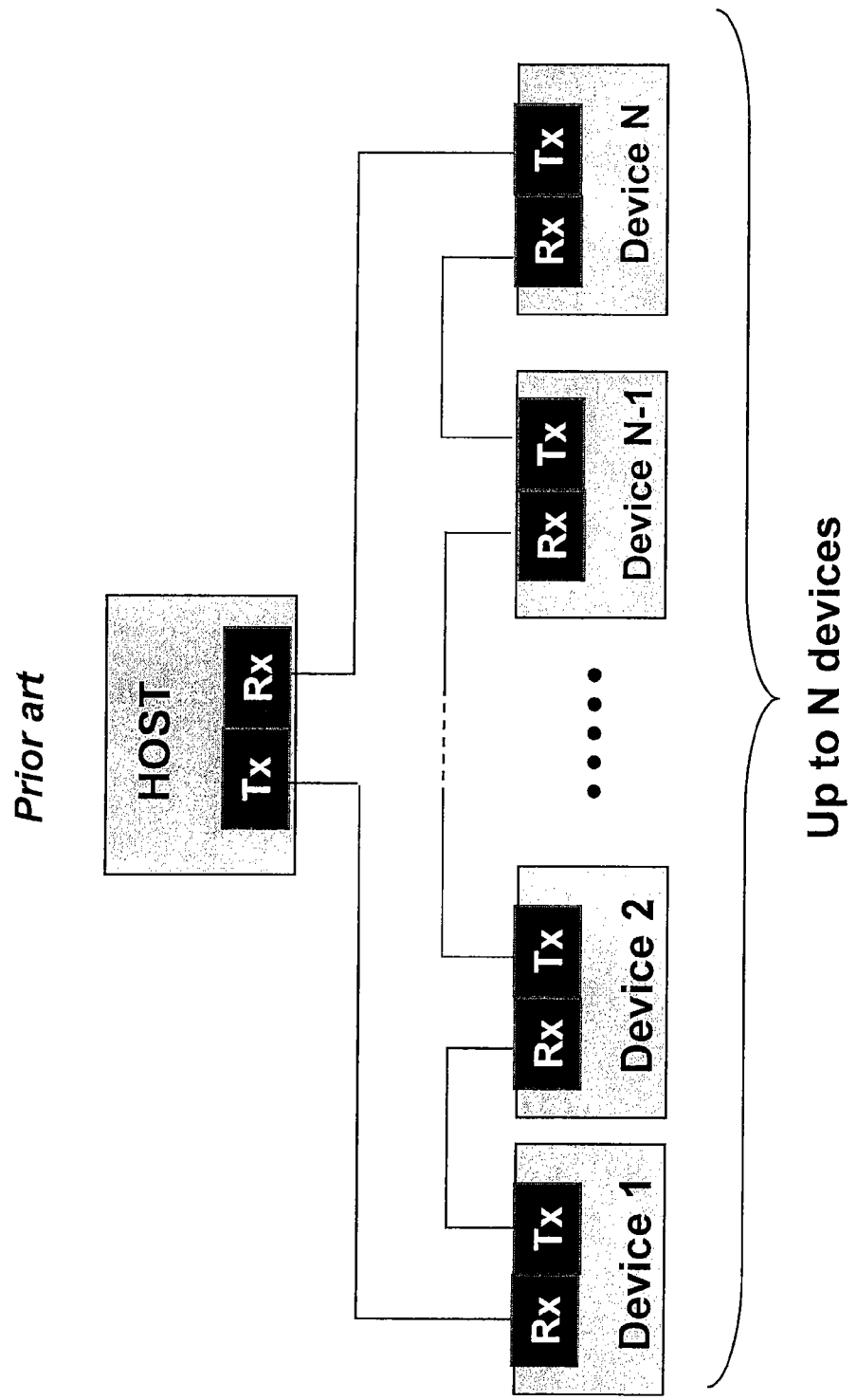
FIG. 1 is a block diagram of a host device and multiple devices in a ring topology.

By way of introduction, the following embodiments generally relate to automatic and controllable control of operation of at least one aspect of a system, such as initializing at least a part of a system. The system includes a host device and one or more devices in communication with the host device. The host device sends a command to one, some or all of the multiple devices to control operation of the one or more devices (such as initialization of the one or more multiple devices).

The command includes information, which may be used by the multiple devices to determine whether to begin operation, such as begin initialization. In one embodiment, the information in the command comprises one or more parameters. The one or more parameters in the command may be indicative of the system resources currently available for performing an operation. For example, the one or more parameters in the command may be indicative of the current system resources available for system initialization. The multiple devices may receive the command and determine whether to perform the operation (such as whether to begin initialization) by reviewing the information in the command (such as reviewing the one or more parameters in the command). The information in the command may be analyzed along with the amount of resources required by the device to perform the operation (such as the amount of resources for the device to initialize) in order for the device to determine whether to begin the operation. For example, if the amount of resources required by the device to perform the operation is greater than the current resource capabilities (as indicated by the one or more parameters in the command), then the operation is not performed.

In another embodiment, the information in the command comprises two or more parameters. The two or more parameters in the command may be indicative of the system resources currently available for performing an operation. For example, the two or more parameters in the command may be indicative of the current system resources available for system initialization. The multiple devices may receive the command and determine whether to perform the operation (such as whether to begin initialization) by reviewing the information in the command (such as reviewing the two or more parameters in the command). The information in the command may be analyzed along with the amount of resources required by the device to perform the operation (such as the amount of resources for the device to initialize) in order for the device to determine whether to begin the operation. For example, if the amount of resources required by the device to perform the operation is greater than the current resource capabilities (as indicated by the two or more parameters in the command), then the operation is not performed.

In this way, the command to begin the operation (such as a command to begin initialization) may take one of several forms, including have one or more parameters or two or more parameters. However, these examples of the number of parameters in the command (whether one or two parameters) are merely for illustration purposes. Regardless, the command may provide the device that receives the command with information (whether in the form of one or two parameters) indicative of the present capabilities of the system to perform the operation (such as initialization).

In one embodiment, the information in the command, indicative of the present capabilities of the system, may comprise a number of devices (such as the number of devices that currently may start initialization). For example, the one or more parameters may indicate how much resources the system is currently capable of providing. In the case of the number of devices, the one or more parameters may indicate how many devices may still be initialized. As discussed in more detail below, one example of indicating the number of devices that may still be initialized may comprise subtracting the current initialization parameter from the resource capability parameter. However, this is merely one example of the one or more parameters in the command that may indicate the number of devices that may still be initialized. In another embodiment, the information in the command, indicative of the present capabilities of the system, may comprise an electrical parameter (such as an electrical current (mA)). The device may then use this information in order for the device to make the determination whether and/or when to perform the operation (such as initialization).

The examples discussed below relate to controlling whether or when to initialize. However, other operations of the one or more multiple devices may be controlled, such as any operation in which a plurality of the devices in the system are requested to operate concurrently. Thus, the disclosed system and method provides a general method for improving or optimizing a resource utilization in which multiple devices perform one or more operations concurrently.

The examples of the one or more parameters are discussed below. However, these examples are merely for illustrative purposes. One parameter may comprise a resource capability parameter, which is indicative of the resource capability of the system (such as the power capability, current consumption, etc. of the host system). The resource capability parameter may take one of several forms. As one example, the parameter may represent the number of devices in the system that the power system can simultaneously initialize. In particular, the resource capability parameter may indicate a number of devices that the host device power system can simultaneously initialize (e.g., 4 devices). As another example, the parameter may represent an electrical parameter that the system can provide. For example, the resource capability parameter may indicate a total amount of electrical current (mA) that the system can output for initialization (e.g., 400 mA). Or, the resource capability parameter may indicate a total amount of power that the system can output for initialization.

Another parameter that may be included in the command sent from the host device may include a current initialization parameter, which is indicative of the devices that are currently initializing. The host device may set the parameter based on the host device's current determination as to the devices that are initializing. For example, if the host device determines that there are no devices currently initializing, the host device can set the current initialization parameter to zero. One or more of the devices may receive the command and update the current initialization parameter depending on the status of the initialization of the device (including whether the device is initializing or whether the device has completed initialization). And, the one or more devices may process the command sent from the host device whether to begin initialization based on the status of the initialization of the device, and based on the one or more parameters in the command sent from host device.

In practice, the host device may send one or more commands at various times in the initialization process. For example, the host device may send a command to begin initialization. In a ring topology, the host device may send the begin initialization command to the devices. The first device receives the command, and analyzes the parameters in the command (including the resource capability parameter and the current initialization parameter) and its own status (including whether the first device needs to be initialized) to determine whether to begin initializing. If the first device determines that the system is capable of initializing the first device and that the first device needs initialization, the first device begins to initialize, modifies the current initialization parameter (to reflect that the first device is initializing) and sends the command (with the modified current initialization parameter) to the second device in the ring topology. The second device (and subsequent devices in the ring topology) may perform a similar analysis to that performed by the first device.

After a device completes initialization, the host device or another device may modify the current initialization parameter to reflect this completion of initialization. For example, the host device may send a subsequent status command to assess what devices in the ring topology are currently initializing, and modify the current initialization parameter based on the assessment. Or, the devices in the ring topology may modify the current initialization parameter upon completion of initializing, and send the modified current initialization parameter to other devices and the host device.

In this way, the sequence of devices is not pre-set and may be dynamically determined based on information, such as the one or more parameters, in the command. And, the multiple devices in the field may use the information, such as the one or more parameters, in the command, and potentially along with its own capabilities/parameters, to make the decision when or whether to begin initialization and when to transfer the command to the following devices. Thus, the multiple devices participate in the decision when to begin initialization and are not passive in the decision-making process. This is unlike other initialization schemes, such as sequential or parallel initialization, in which the host device sends a command to the multiple devices, with the multiple devices passively following the command to initialize when the command is received. And, the resource capability of the system may be better utilized.

In one embodiment, one, some or all of the information in the command may be modified by the device in order to reflect the present capabilities of the system to perform the operation (such as initialization). For example, in a specific embodiment, one or more of the parameters in the command may be modified to reflect the status of the operation of the device (such as whether the device has decided to initialize or whether the device has completed initialization). An example of this is by modifying one of the one or more parameters in the command using an arithmetic operation. As discussed in more detail below, the current initialization parameter may be modified by altering the value of the parameter by "1" either to reflect that a device is initializing or that a device has completed initialization. The modified current initialization parameter may then be compared to the resource capability parameter, and the devices may determine whether the resource capability of the system allows for a current initialization.

For example, if the resource capability of the system enables a certain number of devices, such as 4 devices, to initialize concurrently, the updating of information in the command, such as the current initialization parameter, may better ensure that more often the certain number of devices, such as 4 devices, in the system are concurrently initializing, thereby better utilizing the systems resource capability and potentially reducing the time to initialize the devices in the system.

There are several examples of memory devices, such as Secure Digital ("SD™") memory cards (an example of a relatively slow flash storage device) and Ultra-High-Speed type II (UHS-II) memory cards (an example of a faster flash storage device). SD is a trademark of SD-3C LLC. UHS-II is a standard developed by the SD Associate for next generation SD™ cards and is one example of a "high speed protocol." Another example may be Universal Flash Storage ("UFS") storage devices. "UFS" is a standard developed by UFS task force working for the Joint Electron Device Engineering Council(s) ("JEDEC") Solid State Technology Association.

Figure 2:
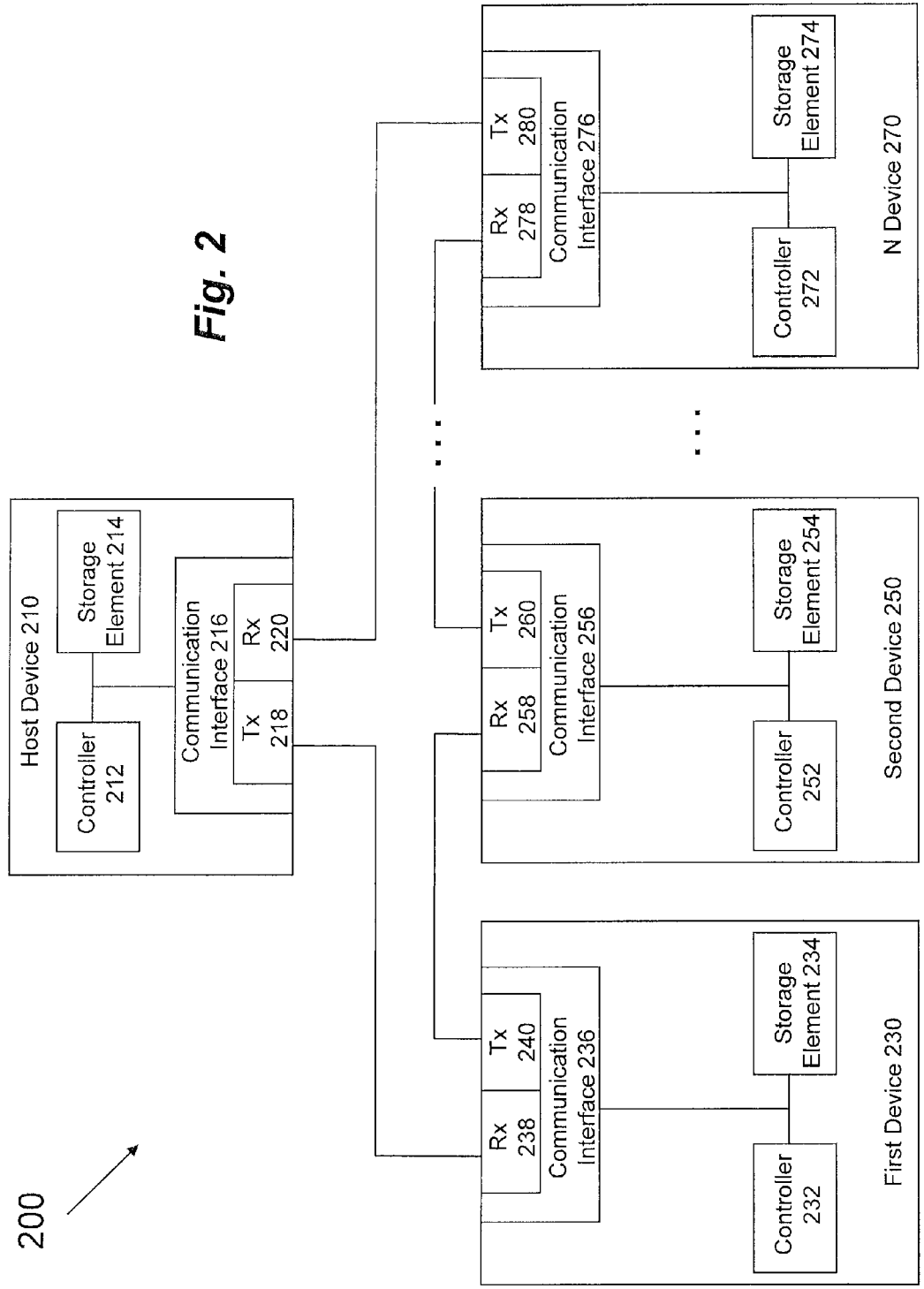
FIG. 2 is a block diagram illustrating the controller, storage element, and communication interface of each of the host device and multiple devices in a ring topology.

FIG. 2 depicts a detailed block diagram 200 of the host device 210 and the multiple devices 230, 250, 270 in a ring topology. The host device 210 may comprise an electronic device such as a computer, a mobile phone, a personal digital assistant (PDA), a gaming device, a communication device, a multimedia player device, any other device adapted to communicate with one or more memory devices, or any combination thereof. The host device 210 may include a controller 212, such as a processor, microcontroller, or other type of arithmetic logic unit. The host device 210 may further include a storage element 214 or other type of memory, such as a non-volatile memory, a random access memory (RAM), flash storage, one or more registers, or other tangible storage. The host device 210 may also include a communication interface 216 to enable communication with multiple devices via the network. The communication interface 216 has a transmitter circuit (Tx) 218 to send messages to the devices and a receiver circuit (Rx) 220 to receive messages from the devices. Thus, using the communication interface 216, the host device 210 is configured to send messages, such as commands, data, or any combination thereof, to the multiple devices 230, 250, 270 via the network. The network may include one or more pairs of data lines to transmit messages between devices 230, 250, 270.

The multiple devices 230, 250, 270 may include a computer and/or a memory device. For example, one or more of the multiple devices 230, 250, 270 may be a flash memory card, such as an enhanced SD™, microSD™ card, Embedded SD (eSD) or SD Input/Output device (SDIO) (SD or microSD are trademarks of SD-3C LLC). As another example, one or more of the multiple devices 230, 250, 270 may include a UHS-II storage device or other type of device that includes UHS-II interface (such as Input/Output communication applications). The multiple devices 230, 250, 270 include a communication interface to enable communication with the host device and other devices via a bus. For example, device 250 includes I/O interface 262 to illustrate wireless communication functionality, such as Wi-Fi or Bluetooth. In this way, devices 230, 250, 270 may comprise a memory device, an I/O communication device, and/or a combination memory device+I/O communication device.

The first device 230 includes a controller 232, such as a processor, microcontroller, or other type of arithmetic logic unit. The first device 230 may further include a storage element 234 or other type of memory, such as a non-volatile memory, a random access memory (RAM), flash storage, one or more registers, or other tangible storage or input/output communication interface (such as Bluetooth, Wi-Fi, WiGIG, etc). The first device 230 includes a communication interface 236 that has a receiver circuit (Rx) 238 and a transmitter circuit (Tx) 240. The receiver circuit (Rx) 238 is configured to receive messages, such as commands and data, from a previous device on the communication path, i.e., the host device 210, via the network. The transmitter circuit (Tx) 240 is configured to transmit messages, such as responses, to a next device on the communication path, i.e., the second device 250 via the network.

The second device 250 includes a controller 252. The second device 250 may further include a storage element 254 or other type of memory. The second device 250 includes a communication interface 256 that has a receiver circuit (Rx) 258 and a transmitter circuit (Tx) 260. The receiver circuit (Rx) 258 is configured to receive messages from the first device 230 on the communication path. The transmitter circuit (Tx) 260 is configured to transmit messages to a next device on the communication path via the network.

The "N" device 270 includes a controller 272 and a storage element 274 or other type of memory. The "N" device 270 further includes a communication interface 276 that has a receiver circuit (Rx) 278 and a transmitter circuit (Tx) 280. The receiver circuit (Rx) 278 is configured to receive messages from another device on the communication path. The transmitter circuit (Tx) 280 is configured to transmit messages to a next device on the communication path via the network, i.e., the host device 210 via the network.

As shown in FIG. 2, the network has a ring topology and messages travel in a single direction along a communication path around the ring. The first device 230 has a first position on the communication path, the second device 250 has a second position on the communication path, etc. The sequential order of the positions of devices corresponds to the sequential order that messages travel from device to device along the communication path. For example, a message sent by the host device 210 may have include a destination identifier (DID) field that indicates a specific destination (such as a specific identifier to identify one of the devices 230, 250, 270) or may include a Broadcast indication, in which case any device that is in a state that can accept the command will accept the command as an addressed recipient.

Although three representative devices 230, 250, 270 are illustrated coupled to the host device 210 via the network, any number of such devices may be coupled to the host device 210 via the network. Also, although the network is schematically illustrated as shown in FIG. 2 connecting the host device 210 and the devices 230, 250, 270 for ease of explanation, various physical structures may be used to form the network having a ring topology for messaging in a single direction. As one illustrative example and in an alternate embodiment, the network may be implemented as a bus that is controlled to emulate a ring topology.

Figure 3:
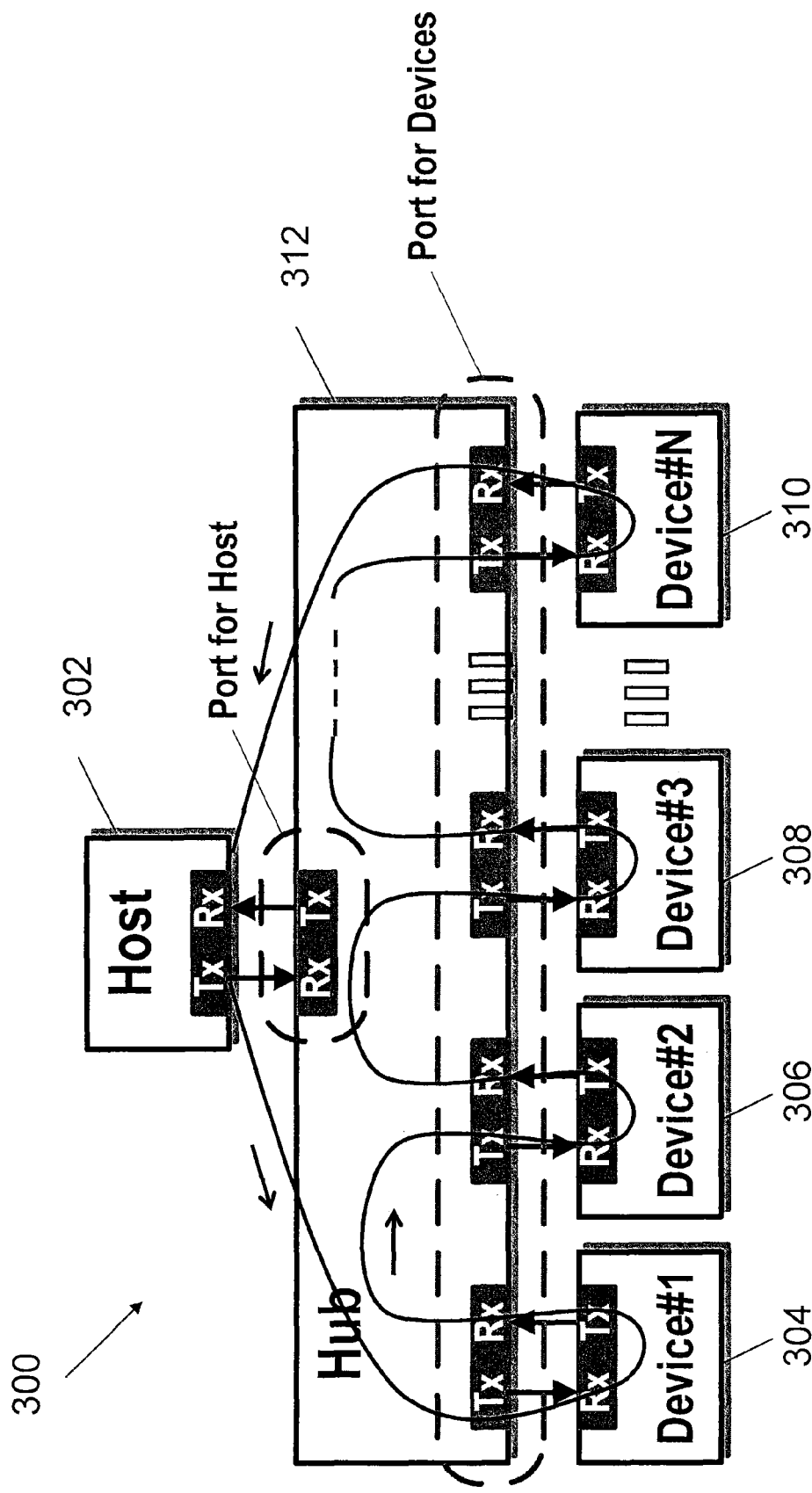
FIG. 3 is a block diagram illustrating the host device and multiple devices in a hub topology.

In addition, although described with respect to a ring topology, in other embodiments, the network may be implemented using other topologies, such as a tree topology, a star topology, a linear daisy chain topology, or a hub topology. For example, a hub topology may have one port for the host device and a plural number of ports for the devices. FIG. 3 illustrates an example of block diagram 300 for a hub topology using a host device 302, devices 304, 306, 308, 310, and hub 312. The hub topology may transmit messages to all connected devices simultaneously or send a broadcast command by emulating a Ring topology in which the broadcast command is actually transferred serially through all the devices (from first to last) through the Hub (e.g., see U.S. patent application Ser. No. 12/509,832, filed Jul. 27, 2009, entitled "DEVICE IDENTIFIER SELECTION, hereby incorporated by reference in its entirety; see also U.S. patent application Ser. No. 12/561,122, filed Sep. 16, 2009, entitled "DEVICE IDENTIFIER SELECTION, hereby incorporated by reference in its entirety). Or, the hub topology may transmit messages by selecting a message destination according to its content. FIG. 3 illustrates the broadcast command path, shown in lines with arrows to designate the path. The broadcast may access all devices, though this is done serially, starting from Device #1 304 and ending with Device #N, passing through the Hub 312. In this way, exact Ring operation behavior may be achieved. The discussion below with respect to the Ring topology may likewise be used in the given Hub topology.

Figure 4:
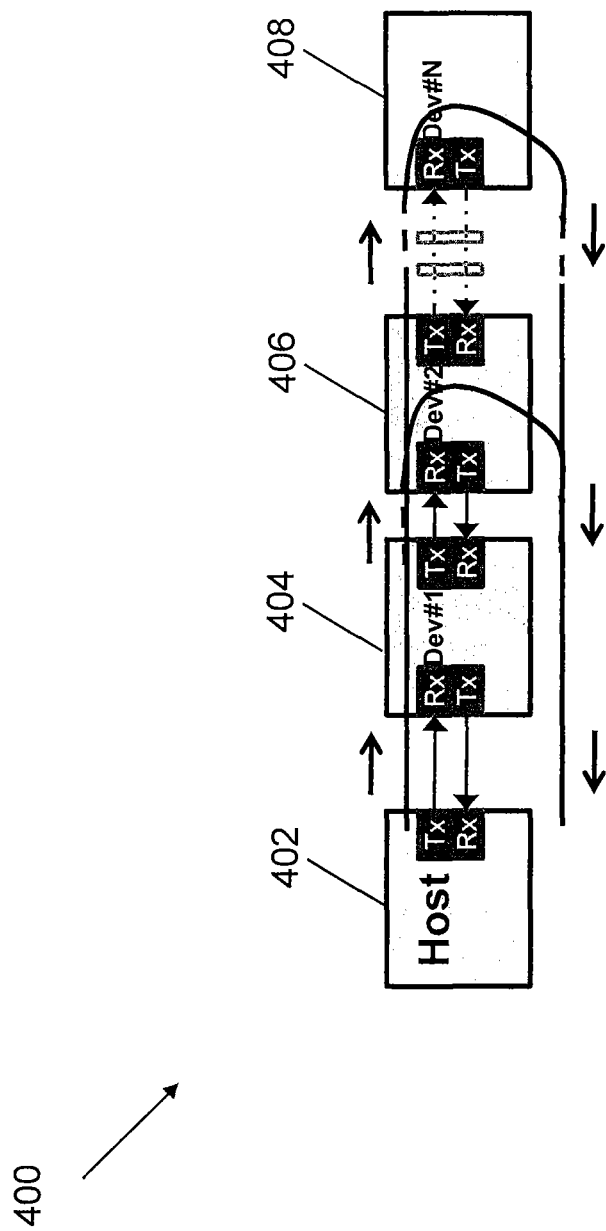
FIG. 4 is a block diagram illustrating the host device and multiple devices in a chain topology.

FIG. 4 illustrates an example of block diagram 400 for a chain topology using a host device 402 and devices 404, 406, 408. Broadcast operation in a Chain topology may be implemented using a broadcast command that is actually accessed all the devices, starting from Device #1 404 and ending in Device #N 408 (similar to the Ring topology). The only difference is that the connection from the Device #N back to the host is passed back through all the devices 404, 406 (while in a Ring topology, a direct path to the Host device exists). Nonetheless, the same concept described for the Ring topology may be used here as well. And, the discussion below with respect to the Ring topology may likewise be used in the given Chain topology. The illustrations of the Ring, Hub, and Chain Topologies are merely for illustration purposes. In this way, the network may be implemented in one or more other topologies with a communication path between the host device and each device that enables transmission and reception of messages.

The host device may send one or more messages or commands for initialization of one or more of the devices, such as devices 230, 250, 270 (in FIG. 2), devices 304, 306, 308, 310 (in FIG. 3) or devices (404, 408, 410). Initialization of the devices may be a step in transitioning the devices to an active state. Initialization may include initializing one or more layers, including the PHY and LINK layers. And, the initialization may set operating conditions of the devices, such as device-dependent initial capabilities and operating values.

The message sent from the host device, such as host device 210 (in FIG. 2), host device 302 (in FIG. 3) or host device 402 (in FIG. 4), may include information, which may be in the form of one or more parameters. The information in the command may be used by the devices, such as devices 230, 250, 270 (in FIG. 2), devices 304, 306, 308, 310 (in FIG. 3) or devices (404, 408, 410), to determine whether to begin initialization.

One parameter may comprise a resource capability parameter, which is indicative of the resource capability of the system. One example of the resource capability of the system may be the available resource output of the host device. The resource capability parameter may take one of several forms. As one example, the parameter may represent the number of devices in the system that the power system can simultaneously initialize. In particular, the resource capability parameter may indicate a number of devices that the host device power system can simultaneously initialize (e.g., 4 devices). As another example, the parameter may represent an electrical parameter that the power system can provide. For example, the resource capability parameter may indicate a total amount of mA that the power system can output for initialization (e.g., 400 mA).

Another parameter that may be included in the command sent from the host device may include a current initialization parameter, which is indicative of the devices that are currently initializing. The current initialization parameter may be modified or adjusted by the host device and/or the devices.

For example, the host device 210 may set the parameter based on the host device's current determination as to which of the devices 230, 250, 270 are initializing. In particular, the host device 210 may send one or more status messages to the devices 230, 250, 270 to determine which devices are currently initializing. The host device 210 may set the current initialization parameter to reflect the devices that are currently initializing. For example, if the host device determines that there are no devices currently initializing, the host device can set the current initialization parameter to zero.

Moreover, one or more of the devices (such as devices 230, 250, 270 in FIG. 2, devices 304, 306, 308, 310 in FIG. 3 or devices 404, 406, 408 in FIG. 4) may modify the current initialization parameter. For example, device 230 may modify the current initialization parameter to reflect that device 230 is initializing or that device 230 has finished initialization. Specifically, device 230 may receive the command to initialize and determine whether device 230 should begin initializing. As discussed in more detail below, device 230 may determine whether it needs to be initialized and if so, compare the resource capability parameter with the current initialization parameter to determine whether the resource capabilities of the system enable initialization of device 230 at this time. If the first device 230 determines that initialization is needed and the system is capable to initialize, the first device 230 may start initializing and modify the current initialization parameter to reflect that the first device 230 is initializing. Moreover, device 230 may modify the current initialization parameter to reflect that device 230 has completed initialization. After the first device 230 completes initialization, device 230 may send a message in order to communicate a change in the current initialization parameter. As one example, the first device 230 may send a message to the host device 210 indicating that initialization of the first device 230 is complete, so that the host device 210 may modify the current initialization parameter to reflect this, and send a subsequent broadcast command that includes the modified current initialization parameter. As another example, the first device 230 may modify the current initialization parameter and send a message to device 250, 270 and/or host device 210 to indicate the change in the current initialization parameter. As yet another example, the device 230 may receive a status message from the host device 210. If the first device 230 is initializing, the first device 230 may hold the status message until the first device 230 is finished initializing, and then forward the status message (with the updated current initialization parameter indicating that the first device 230 has completed initialization) to devices 250, 270. As still another example, the first device 230 may send a message to devices 250 and/or 270 to indicate that initialization of device 230 is complete, so that devices 250 and/or 270 may modify the current initialization parameter to reflect this and begin initialization if necessary.

Figure 5:
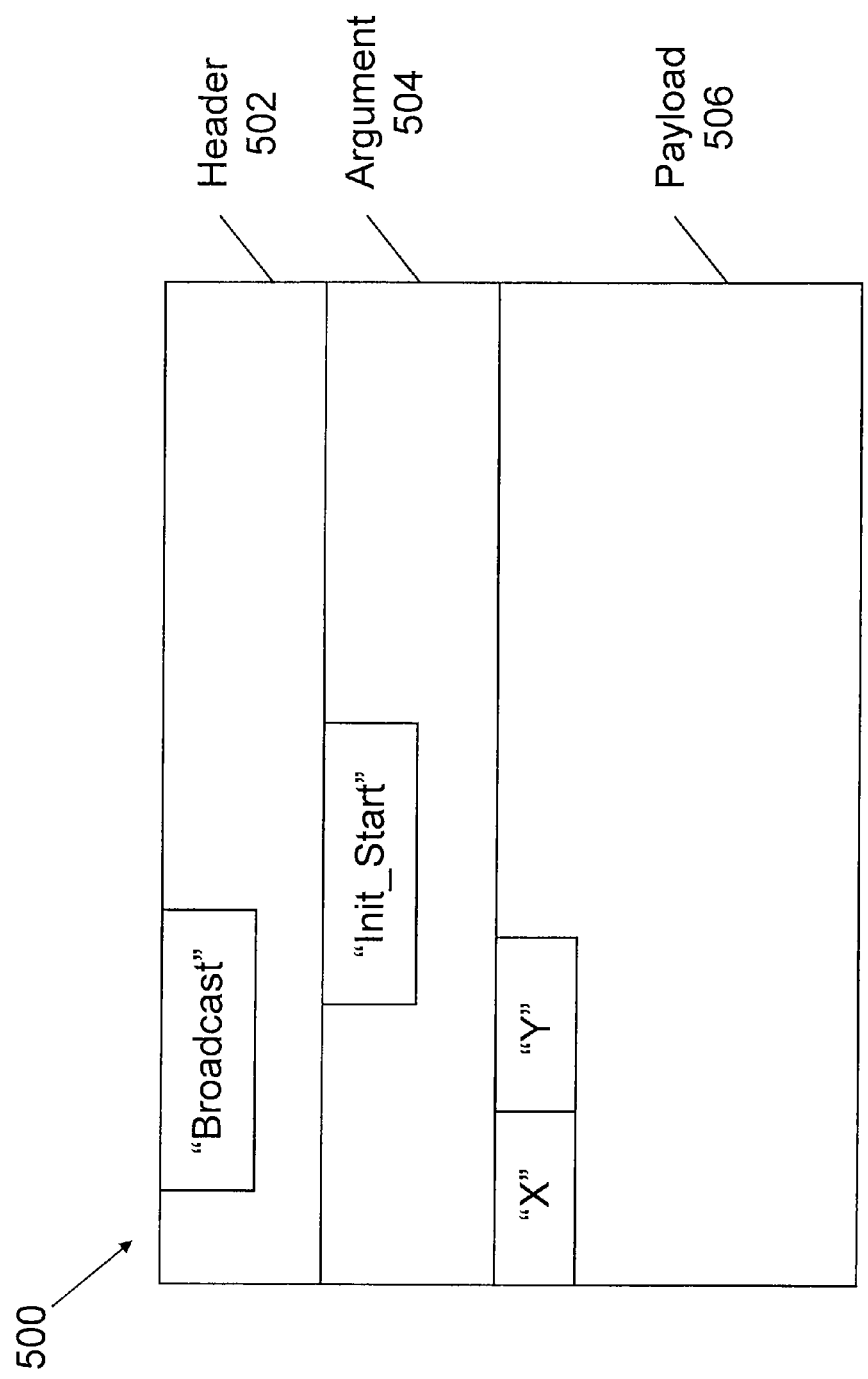
FIG. 5 is a format of the command to begin initializing.

The host device 210 sends a single command that includes both the resource capability parameter and the current initialization parameter, as illustrated in FIG. 5. Or, the host device may send the resource capability parameter and the current initialization parameter in separate commands. For example, the resource capability parameter may be sent to devices 230, 250, 270 separately and stored in storage element 234, 254, 274 for use later when the separate command with the current initialization parameter is received.

In practice, the host device may send one or more commands at various times in the initialization process. For example, the host device 210 may send a command to begin initialization and subsequent command(s) to determine the status of the initialization. In a ring topology, the host device 210 may send the begin initialization command to the first device 230, with the first device 230 reviewing its initialization status and the one or more parameters to determine whether to begin initialization. Specifically, the initialization status of the first device 230 may be "initialized," "not initialized", or "initializing," as discussed in more detail with respect to FIG. 7.

If the first device 230 is "initialized" (meaning that the first device does not require a current initialization), the first device 230 may send the command, without altering the one or more parameters, to another device (in the ring topology, the first device 230 may send the command to the second device 250). If the first device 230 is "not initialized" (meaning the first device 230 is to be initialized), the first device 230 reviews the parameters in the command received to determine whether to begin initialization. The first device 230 may compare the current initialization parameter with the resource capability parameter (and potentially the first device's own requirements) to determine whether to begin initializing. In the example where the current initialization parameter is indicative of the number of devices that are being initialized and if the resource capability is indicative of the total number of devices that are capable of being initialized at once, if the current initialization parameter is less than the resource capability parameter, this indicates that the system may be capable of initializing the first device 230. If the comparison indicates that the system is capable of initializing the first device 230, the first device 230 begins initialization. In the example where the current initialization parameter is indicative of the total current presently drawn for initializing devices and if the resource capability parameter is indicative of the total current the system can provide for initialization, the first device 230 may examine its own requirements to determine whether to begin initialization. In particular, the first device 230 may access storage element 234 to determine how much current the first device 230 requires when initializing (such as 100 mA). The first device 230 may add the amount of current the first device requires for initialization to the current initialization parameter. If the total of the current the first device requires for initialization and the current initialization parameter is less than or equal to the resource capability parameter, this indicates that the system is capable of initializing the first device 230.

And, if the first device 230 determines that the system is capable of currently initializing the first device 230, the first device 230 may modify one or more of the parameters in the command and send the command to another device. The first device 230 may change the information in the command, such as the current initialization parameter, to indicate that the first device 230 is initializing. The change to the information may comprise an arithmetic operation. For example, the first device may add its own current consumption requirement for initialization to the current initialization parameter, as discussed in more detail below. The first device 230 may then send the command to the second device 250 in the ring topology. If the comparison of the current initialization parameter with the resource capability parameter indicates that the system is incapable of initializing the first device 230, the first device 230 does not begin initializing, and sends the command to the next device. The second device 250 may receive the command sent from the first device 230 and perform the same analysis as was performed by the first device 230. If the first device 230 is "initializing," the first device 230 may hold the command until the first device 230 has completed initializing, and then send the command to the next device. The first device 230 may modify the current initialization parameter to reflect that the first device 230 has finished initializing. After the command has filtered through the multiple devices 230, 250, 270, the command may be returned to the host device 210.

In addition to the begin initialization command, the host device may send a subsequent command after sending the begin initialization command. The subsequent command may comprise a status command to determine the status of the initialization. Or, the host device may send the next initialization command for the next group of devices or a single command for an entire initialization process. The host device may receive a response to the command, analyze the response, and determine the status of the initialization of the one or more devices. For example, the host device may send a command (such as a begin initialization command or a status command) with information in it (such as a command with one or more parameters). The one or more devices can modify the information in the command (such as modifying one or more of the parameters) if the device is initializing. The host device may then analyze the response sent from the one or more devices (such as device N device 270 or 310) to determine the status of the one or more devices, such as whether any of the devices are initializing. The host device may compare the information in the command with the information received in the response to determine the status of the devices. If the information in the command is the same as the information received in the response, the host device may determine that none of the devices are initializing since if a device is initializing, the information in the command is modified (as discussed below).

Using the current initialization parameter and the resource capability parameter, the sequence of initializing the devices is not pre-set and may be dynamically determined based on these parameters in the command. And, the multiple devices in the field may use the information in the command, such as the parameters in the command, to make the decision when to begin initialization. Thus, the multiple devices participate in the decision when to begin initialization and are not passive in the decision-making process. This is unlike other initialization schemes, such as sequential or parallel initialization, in which the host device sends a command to the multiple devices, with the multiple devices passively following the command to initialize when the command is received. This is also unlike a methodology in which devices are initialized per some pre-configuration of the devices, requiring additional effort and cost.

Figure 6:
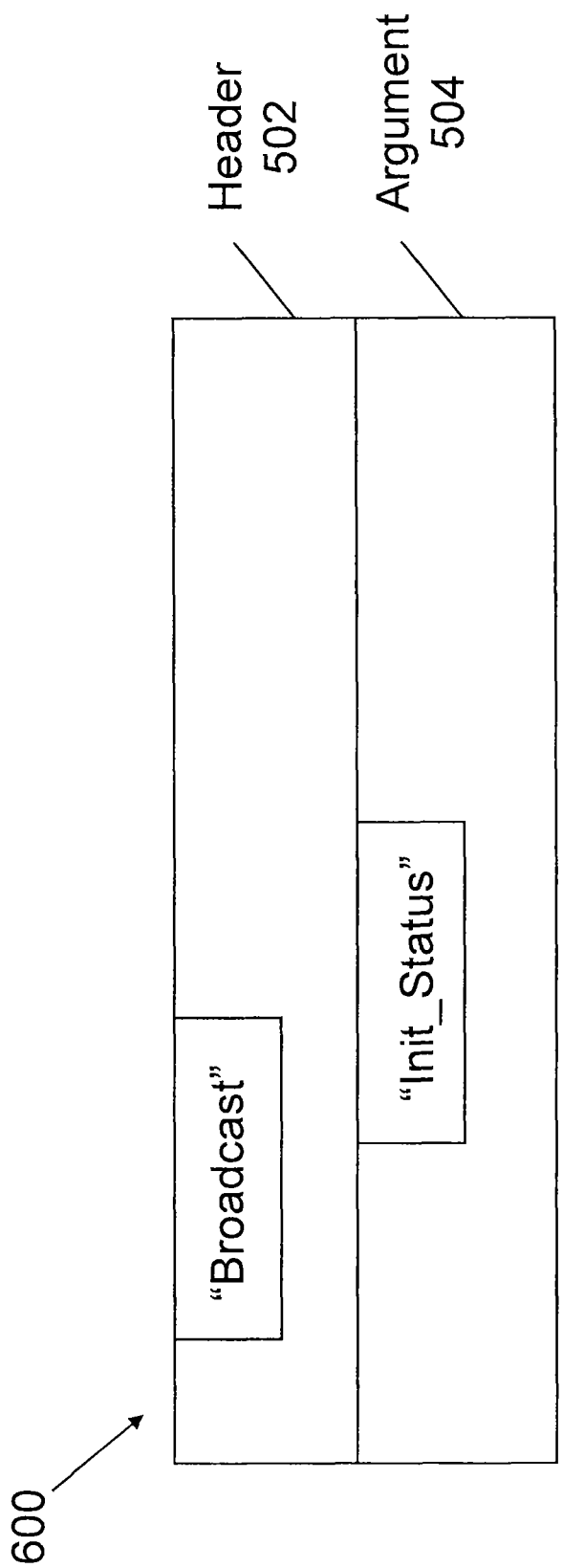
FIG. 6 is a format of the command for a status check of the initialization process.

FIGS. 5 and 6 depict the formats of the commands sent from the host device 210. In particular, FIG. 5 depicts the fields when sending the DEVICE_INIT_START CCMD, which represents the begin initialization command.

As shown in FIG. 5, the message 500 includes a header 502, argument 504, and payload 506. The header 502 may include a field for the Source ID/Destination ID, or Broadcast indication. The argument 504 may include the command name, such as an indication that the message is a DEVICE_INIT_START command. Further, the resource capability parameter (as represented by "Y") and the current initialization parameter (as represented by "X") may be part of the payload. However, the message 500 illustrated in FIG. 5 is merely for illustrative purposes. The information in message 500, including the resource capability parameter and the current initialization parameter, the broadcast indication, and the command indication may be organized in different ways than that depicted in FIG. 5.

FIG. 6 depicts the fields when sending the DEVICE_INIT_CHECK_STATUS CCMD, which represents the status command. As shown in FIG. 6, the message 600 includes a header 502, and argument 504. Similar to FIG. 5, the header 502 may include a field for the Source ID/Destination ID, or Broadcast indication. The argument 504 may include an indication that the message is a DEVICE_INIT_CHECK_STATUS command. The resource capability parameter (as represented by "Y") and the current initialization parameter (as represented by "X") need not be part of the payload in message 600. Both DEVICE_INIT_START and DEVICE_INIT_CHECK_STATUS messages may be broadcast CCMD. DEVICE_INIT_START message may be a trigger to start device initialization for a group of devices, such as devices 230, 250, 270 illustrated in FIG. 2. The initialization method may be programmed by the host device using the parameters stored in the payload area. DEVICE_INIT_CHECK_STATUS message may be issued to check each device's, a group of devices', or the full system's initialization status.

Figure 7:
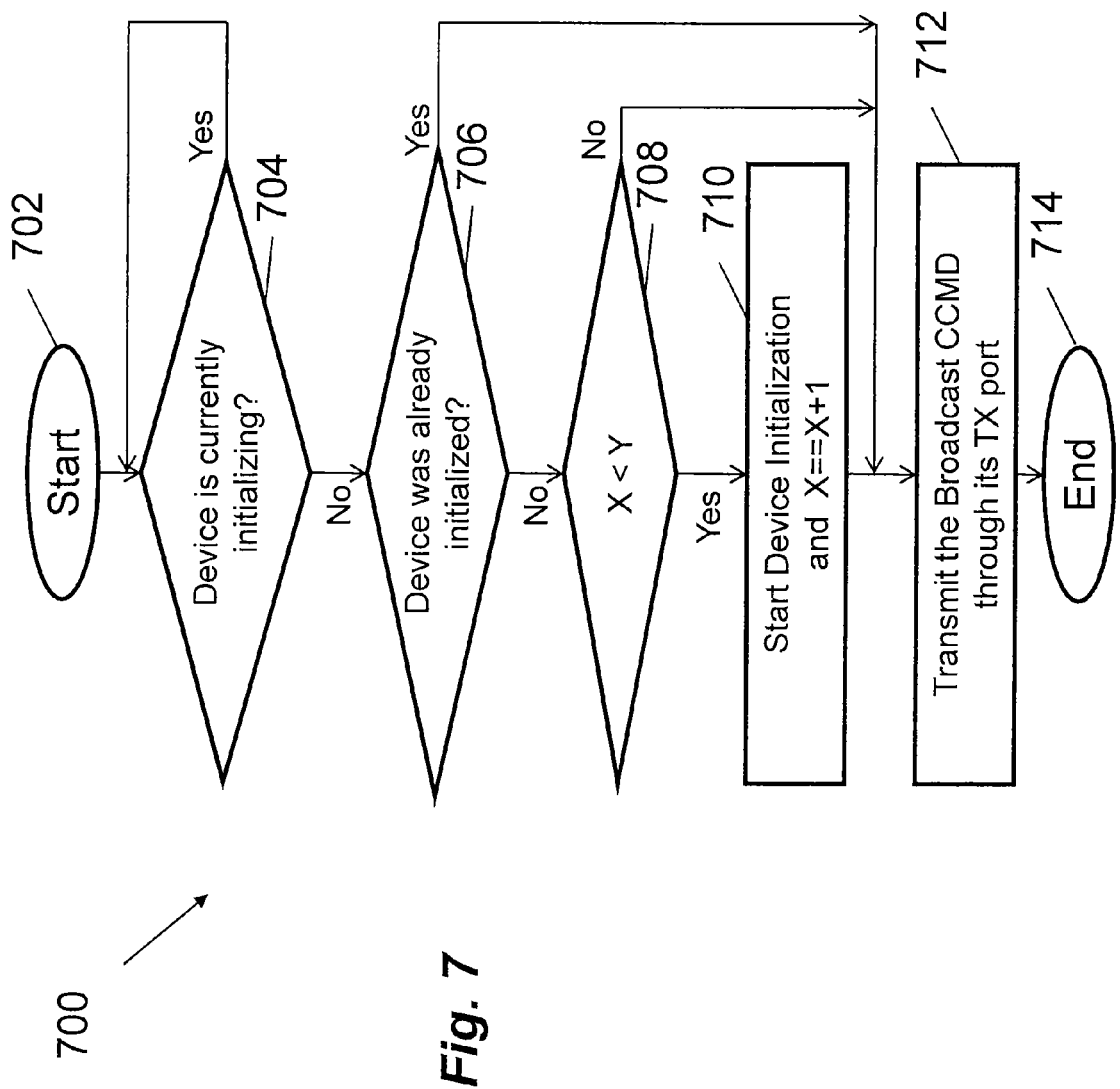
FIG. 7 is one example of a flow chart of the device when receiving the command to begin initializing.

FIG. 7 illustrates one example of a flow chart 700 of the device, such as devices 230, 250, 270 (in FIG. 2), devices 304, 306, 308, 310 (in FIG. 3) or devices (404, 408, 410) to determine whether to begin initialization using one type of current initialization parameter and resource capability parameter represented by the number of currently utilized devices and the number of devices that can be supported by the system, respectively. At 702, after receiving the command (which includes the resource capability parameter (as represented by "Y") and the current initialization parameter (as represented by "X"), the flow chart starts. At 704, it is determined whether the device is currently initializing. If so, the device may hold the command until the device completes initialization (as represented by the flow chart in FIG. 7 looping back to block 704).

At 706, it is determined whether the device is already initialized. If the device is already initialized, the flow chart transfers to 712. If the device has not been initialized, the device determines if $X<Y$ at 708. If $X=Y$, this reflects that the resource capability is being fully utilized and that no other device can begin initialization. If the total does not exceed the capability of the system, the first device may be initialized at block 710. Further, the current initialization parameter ("X") may be modified with an arithmetic operation to reflect that the device is being initialized. For example, the current initialization parameter "X" may be changed by +1 (such as increased by +1), if "X" represents the number of devices currently initializing as shown at 710. The flow chart then moves to 712, whereby the device transmits the broadcast CCMD from its Tx port with the current initialization parameter modified.

If $X \geq Y$, at 712, the device transmits the broadcast CCMD from its Tx port with the current initialization parameter unchanged. In a system with a Chain Topology, the command, at the given condition, may be sent back (upward) from device 404 to the host device 402, saving the path through the devices 406, 408 in the downward path). The shortcut through device #2 406 in FIG. 4 illustrates such a case. At 714, the flow chart ends.

An example for the processing of the commands by the host and the devices. In the example, none of devices 1-N are initialized and the host device can initialize two devices at one time. To begin initialization, the host device may send a command that includes information (including one or more parameters) that indicates power capability of initializing two devices. The command is sent to Device 1, which is not initialized. Device 1 examines the information in the command and determines that it can initialize (since the information in the command indicates that two devices can initialize), and begins initialization. Device 1 then sends the command, with the information in the command modified to indicate that one device can initialize. Device 2, which is not initialized, receives the command. Device 2 examines the information in the command and determines that it can initialize (since the information in the command indicates that one device can initialize), and begins initialization. Device 2 then sends the command, with the information in the command modified to indicate that no devices can initialize. The subsequent devices (Device 3 to Device N) receive the command, determine that it cannot initialize, and forward the command to the next device. Ultimately, the host device receives the command.

The host device may issue a subsequent command to the devices. The subsequent command may include information for the devices to make the determination whether to initialize. The host device may send the subsequent command to the devices. If a device is initializing, the device may hold the subsequent command (such as shown at block 704). After the device is finished initializing, the device may send the subsequent command (with the information needed by the device to make the determination whether to initialize) to the next device. This sequence may continue until some or all of the devices are initialized.

Figure 8:
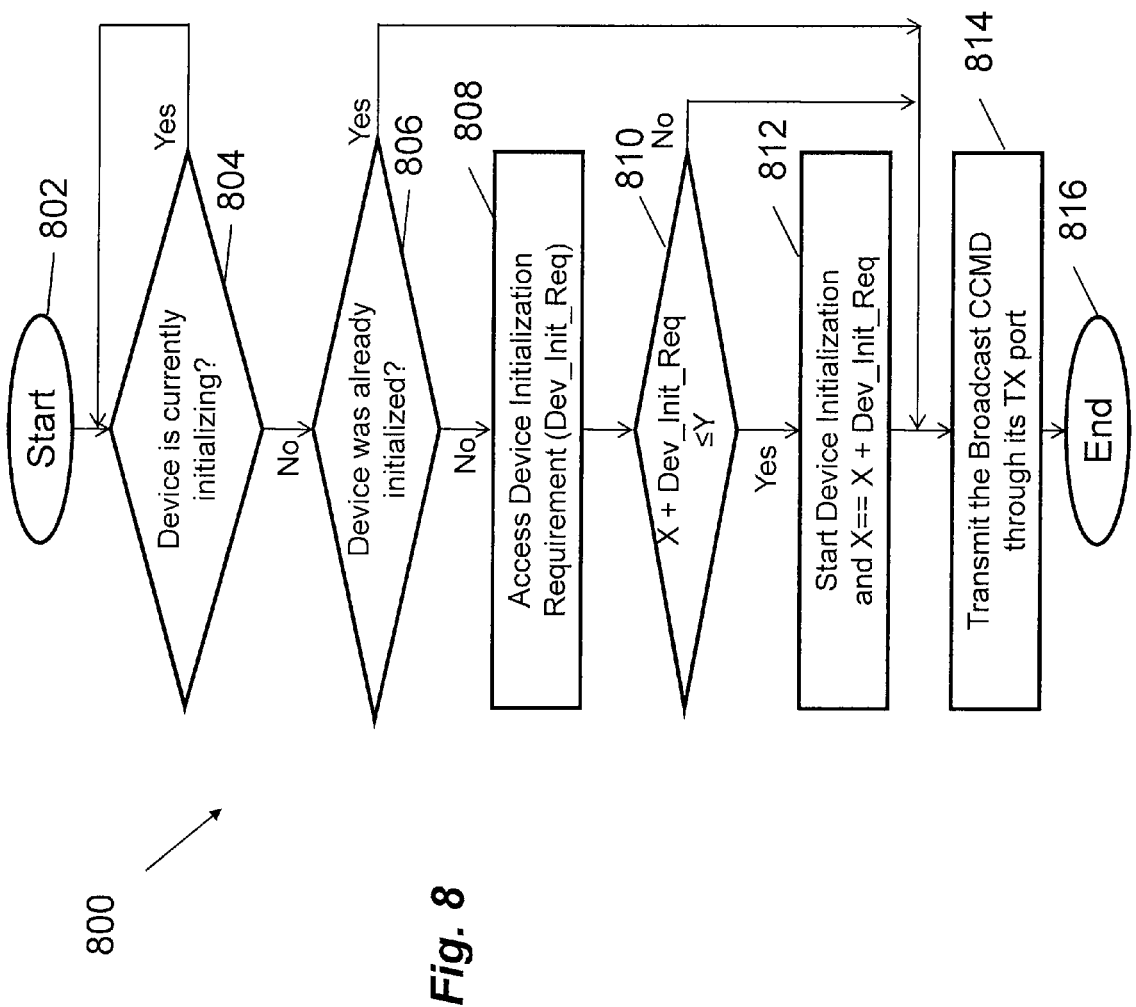
FIG. 8 is another example of a flow chart of the device when receiving the command to begin initializing.

FIG. 8 illustrates another example of a flow chart 800 of the device such as devices 230, 250, 270 (in FIG. 2), devices 304, 306, 308, 310 (in FIG. 3) or devices (404, 408, 410) to determine whether to begin initialization using another type of current initialization parameter and resource capability parameter. At 802, after receiving the command (which includes the resource capability parameter (as represented by "Y") and the current initialization parameter (as represented by "X"), the flow chart starts. At 804, it is determined whether the device is currently initializing. If so, the device may hold the command until the device completes initialization (as represented by the flow chart in FIG. 8 looping back to block 804).

At 806, it is determined whether the device is already initialized. If the device is already initialized, the flow chart transfers to 814. If the device has not been initialized, the device accesses a device initialization requirement (Dev_Init_Req). If the resource capability parameter is represented by an electrical parameter, such as a total amount of current that may be output by the power system, the device may access its own electrical parameter (such as current necessary to initialize) in order to determine whether to initialize. After accessing Dev_Init_Req, device may determine if initializing will exceed the capability of the system. In particular, device may add Dev_Init_Req (which may be stored in storage element 234) to the current initialization parameter ("X") and compare it to the resource capability parameter ("Y") at block 810. In particular, if the amount of current to initialize first device 230 is 100 mA, "X"=200 mA, and "Y"=500 mA, the first device 230 may add 100 mA to 200 mA (the amount of current currently necessary to initialize the devices, if the first device 230 begins initialization). The total of 300 mA may be compared with 500 mA to determine if it exceeds the total amount of current that may be output by the power system.

If X+Dev_Init_Req>Y, then initializing the device at this time will exceed the capability of the system, so the flow chart transfers to block 814. If X+Dev_Init_Req≤Y, then initializing the device at this time will not exceed the capability of the system, so the device begins to initialize at 812. Further, the current initialization parameter ("X") may be modified to reflect that the device is being initialized. For example, at 812, the current initialization parameter "X" may be increased by Dev_Init_Req, if "X" represents the total current drawn by the devices currently initializing. The flow chart then moves to 814, whereby the device transmits the broadcast CCMD from its Tx port with the current initialization parameter modified. The flow chart 800 then ends at 816.

Figure 9:
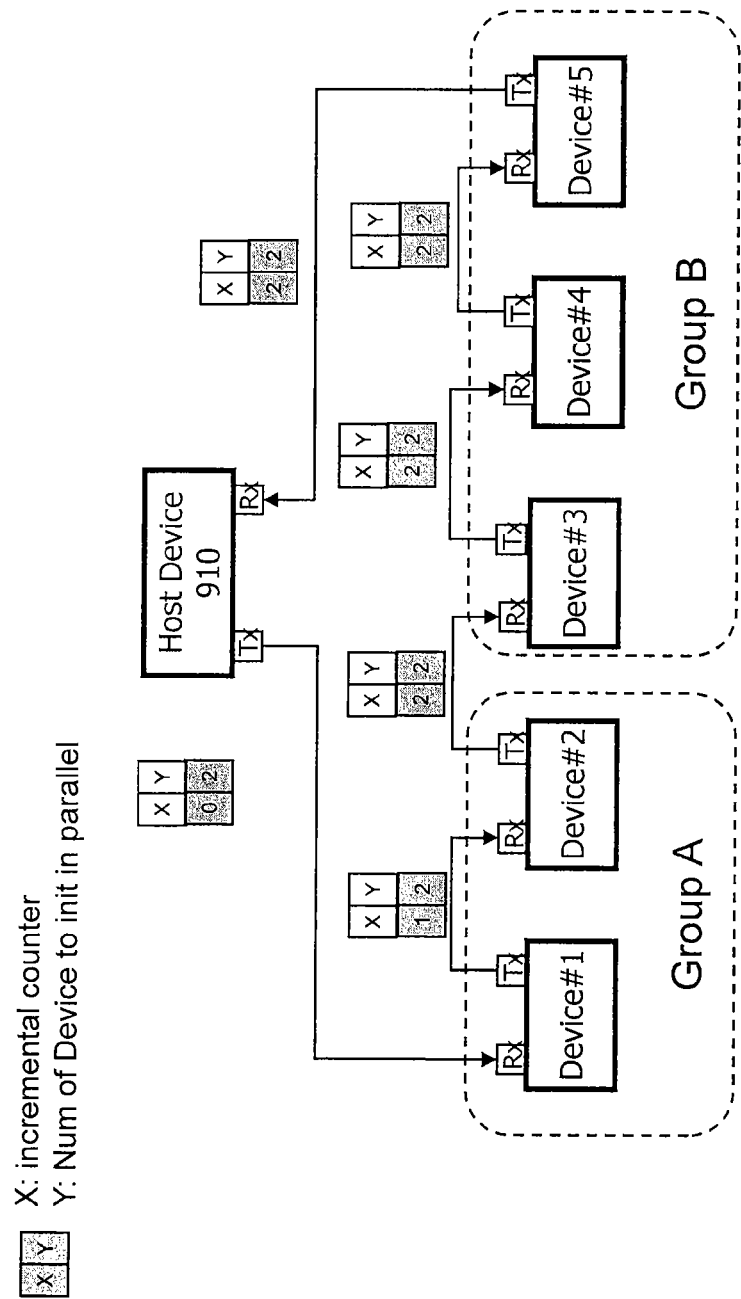
FIG. 9 is a block diagram illustrating a first stage of the device initialization process.
Figure 10:
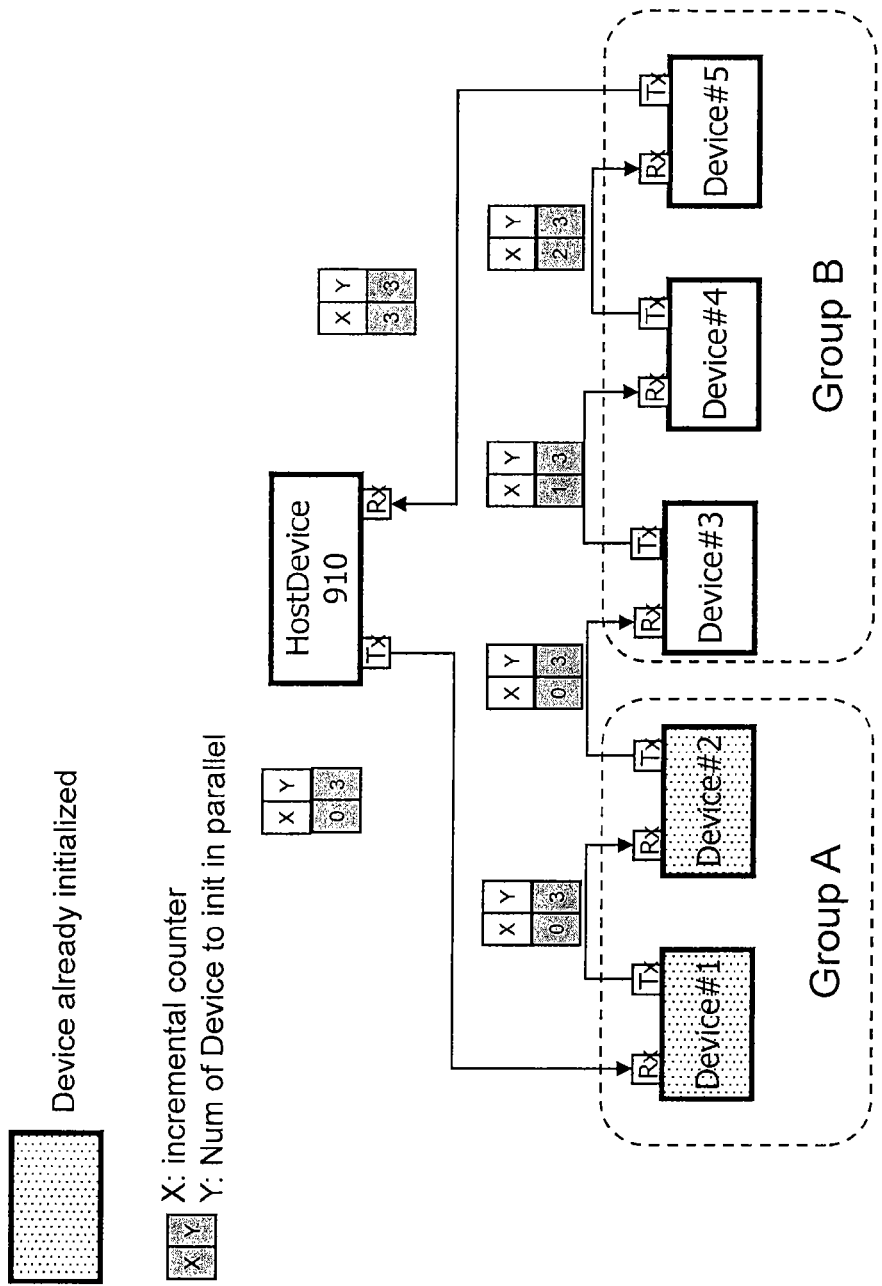
FIG. 10 is a block diagram illustrating a second stage of the device initialization process.

FIGS. 9 and 10 depict a sequence of initialization in which the host device 910 begins initializing Device #1 and Device #2 (Group A) at the first stage (depicted in FIG. 7) and Device #3, Device #4, and Device #5 (Group B) at the second stage (depicted in FIG. 8). For the first stage (depicted in FIG. 9), the host device 910 issues DEVICE_INIT_START with X=0 and Y=2 (assuming the method as described in FIG. 7 is used). When any of the devices in FIG. 6 receives the broadcast CCMD, it checks X and Y. If X<Y, the device starts its device initialization and does nothing otherwise. As Device #1 receives CCMD with X<Y, it starts device initialization, increments the value of X by one and transmits the updated broadcast CCMD from its Tx port. Behavior of Device #2 is same as that of Device #1. As Device #3 through Device #5 receive the broadcast CCMD with X=Y=2, Device #3 through Device #5 do not start Device Initialization. Finally, the updated broadcast CCMD is transmitted to the host device 910. After that, the host device 910 may either issue DEVICE_INIT_CHECK_STATUS or send the DEVICE_INIT_START for the next group of devices (as described in the next paragraph). When the Device receives it during Device Initialization, it transmits the command after completing the initialization. When it does not start or completes the initialization, the device can transmit the command immediately.

FIG. 10 illustrates the second stage of the example of Device Initialization process. At that time, the host device 910 issues DEVICE_INIT_START with X=0 and Y=3 in order to initialize three Devices. When Device #1 receives the broadcast CCMD, then if it's own Initialization is completed, it will transmit the CCMD to the following device. If it is still initializing, the device will hold the CCMD until it completes its own Initialization and will transmit the CCMD to the next device upon completion. Behavior of Device #2 is the same as that of Device #1. When Device #3 receives the command, it starts its Device Initialization as X<Y. In addition, Device #3 increments X by one and transmits the updated command (with the updated current initialization parameter) from its Tx port. Device #4 and Device #5 act the same as Device #3. After the host device 910 receives the command, the host device 910 issues DEVICE_INIT_CHECK_STATUS (which is the same as the first stage depicted in FIG. 9), and recognizes all Device Initializations are finished as the host device 910 already knows the total number of Devices is five. The Device's operation flow of receiving DEVICE_INIT_START is summarized as FIG. 7. The host device 910 sets X=0 and Y=1 for DEVICE_INIT_START in case of a single device init at a time (sequential init) or in case of a single device connection like in POINT TO POINT Connection.

In another embodiment, a method for operating a device in a system is provided, the method comprises receiving a command via a storage device communication interface, with the command including an indication of the amount of resources that the device may use. As discussed above, the indication may be in several forms, include one or more parameters, or two or more parameters. For example, the form of the indication may be a current initialization parameter that is indicative of current initialization of the system and/or a resource capability parameter indicative of resource capabilities of at least a part of the system.

The method may further include determining by the device whether to begin an operation for the device based on the indication of the amount of resources that the device may use, such as the resource capability parameter and/or the current initialization parameter, and operating the device based on determining whether to begin the operation.

The method for operating a device may include the operation of initialization of the device and determining whether to begin the operation comprises determining whether to begin initialization. The device may then determine whether to begin initialization based on the indication of the amount of resources that the device may use (such as the resource capability parameter and/or the current initialization parameter). The command for initialization may include the indication of the amount of resources that the device may use, such as the resource capability parameter and/or the current initialization parameter, wherein the resource capability parameter is indicative of a number of devices capable of simultaneously initializing using power capabilities of the at least a part of the system. If the device is currently initializing, the method may further include waiting, until after the device completes initialization, to send the command to another device. In the method, determining whether to begin the operation may be based on the resource capability parameter, the current initialization parameter, and a resources requirement of the device.

The current initialization parameter may be indicative of a cumulative value for total resources currently utilized for the initialization. And, the resource capability parameter may be indicative of a total electrical current (mA) output capability of the at least a part of the system. Determining whether to begin initialization may include accessing the resources requirement of the device for initialization and determining whether to begin initialization based on the current initialization parameter, the resource capability parameter, and the resources requirement of the device.

In the initialization, the device may receive a current operation parameter indicative of current operation of the system, with the device determining whether to begin the operation based on the resource capability parameter and the current operation parameter. The device may determine whether to begin the operation based on the resource capability parameter, the current operation parameter, and a resources requirement of the device. And, the current operation parameter may be indicative of a cumulative value for total resources currently utilized for the operation. The resource capability parameter may be indicative of a total electrical current (mA) output capability of the at least a part of the system. The device may determine whether to begin the operation by accessing the resources requirement of the device for performing the operation and determining whether to begin performing the operation based on the current operation parameter, the resource capability parameter, and the resources requirement of the device.

The resource capability parameter may be indicative of a number of devices capable of simultaneously performing the operation using power capabilities of the at least a part of the system. If the device is currently performing the operation, the device may wait until after the device completes performing the operation to send the command to another device.

In another embodiment, a device is provided that includes a storage device communication interface and a controller in communication with the storage device communication interface, the controller operative to receive a command via the storage device communication interface, the command including an indication of the amount of resources that the device may use. The indication may be in several forms, include one or more parameters, or two or more parameters. For example, the form of the indication may be a current initialization parameter that is indicative of current initialization of the system and/or a resource capability parameter indicative of resource capabilities of at least a part of the system.

The controller may further be operative to determine whether to begin the operation based on the indication of the amount of resources that the device may use, such as the resource capability parameter and/or the current initialization parameter, and operate the device based on determining whether to begin the operation.

The operation of the device may include initialization, with the controller being operative to determine whether to begin initialization. Further, the command may include a current initialization parameter indicative of the multiple devices that are currently initializing and the controller may be operative to determine whether to begin initialization based on the resource capability parameter and the current initialization parameter. The device comprises a memory device.

The command may comprise the resource capability parameter and the current initialization parameter. The resource capability parameter may be indicative of a number of devices capable of simultaneously initializing using power capabilities of the at least a part of the system. And, if the device is currently initializing, the controller may be further operative to wait, until after the device completes initialization, to send the command to another device.

Moreover, the controller may be operative to determine whether to begin the operation based on the resource capability parameter, the current initialization parameter, and a resources requirement of the device. And, the current initialization parameter may be indicative of a cumulative value for total resources currently utilized for the initialization. Also, the resource capability parameter may be indicative of a total electrical current (mA) output capability of the at least a part of the system, with the controller being operative to determine whether to begin initialization by: accessing the resources requirement of the device for initialization; and determining whether to begin initialization based on the current initialization parameter, the resource capability parameter, and the resources requirement of the device.

The device may receive a current operation parameter indicative of current operation of the system and the controller may determine whether to begin the operation based on the resource capability parameter and the current operation parameter. The controller may be configured to determine whether to begin the operation based on the resource capability parameter, the current operation parameter, and a resources requirement of the device. The current operation parameter may be indicative of a cumulative value for total resources currently utilized for the operation. And, the resource capability parameter may be indicative of a total electrical current (mA) output capability of the at least a part of the system, with the controller being operative to determine whether to begin the operation by: accessing the resources requirement of the device for performing the operation; and determining whether to begin performing the operation based on the current operation parameter, the resource capability parameter, and the resources requirement of the device.

The resource capability parameter may be indicative of a number of devices capable of simultaneously performing the operation using power capabilities of the at least a part of the system. If the device is currently performing the operation, the controller may be further configured to wait, until after the device completes performing the operation, to send the command to another device.

Still another embodiment includes a method for a host device to control initialization of at least a part of a system, the method comprising generating a command by the host device, the command indicative of instructing the device to initialize and including an indication of the amount of resources that one or more devices in the system may use, such as a resource capability parameter indicative of resource capabilities of at least a part of the system. The method further comprises sending the command from the host device using a host device communication interface.

The command in the method may include a current initialization parameter indicative of current initialization of the system. The resource capability parameter may be indicative of a number of devices capable of simultaneously initializing using power capabilities of the at least a part of the system and the current initialization parameter may be indicative of a number of devices currently initializing in the system. The current initialization parameter may be indicative of a cumulative value for total resources currently utilized for initialization of the system.

The method may be used for a system that comprises the host device and a plurality of devices. And, the command used in the method may comprise a broadcast command to the plurality of devices. The system may comprise a topology, such as a topology selected from the group consisting of ring, hub, and chain.

The method may include generating a status command for assessing initialization completion of devices in the system and sending the status command using the host device communication interface.

Another embodiment is directed to a host device that comprises a communication interface and a controller in communication with the communication interface, the controller operative to generate a command, the command indicative of instructing a device to initialize and including an indication of the amount of resources one or more devices in the system may use, such as a resource capability parameter indicative of resource capabilities of at least a part of the system. The controller is further operative to send the command from the host device using the communication interface.

The command sent from the host device may further include a current initialization parameter indicative of current initialization of the system. The resource capability parameter may be indicative of a number of devices capable of simultaneously initializing using power capabilities of the at least a part of the system and the current initialization parameter may be indicative of a number of devices currently initializing in the system. The current initialization parameter may be indicative of a cumulative value for total resources currently utilized for initialization.

The command sent from the host device may comprise a broadcast command to a plurality of devices. And, the plurality of devices may be arranged in a topology, with the topology being selected from the group consisting of ring, hub, and chain.

The controller in the host device may be further operative to: generate a status command for assessing which devices are currently initializing; and send the status command using the communication interface. Moreover, the controller in the host device may be operative to send an initialization initiation command to a plurality of devices in the system and a status command to the plurality of devices at an end of initialization, and the plurality of devices may hold the initialization initiation command automatically until completion of a respective device's initialization.

The controller in the host device may be operative to send an initialization initiation command to a device in the system regardless of whether the device is currently initializing and if the device is currently initialization when receiving the initialization initiation command, the device may wait until after the device completes initialization before sending the initialization initiation command to another device in the system.

It is intended that the foregoing detailed description be understood as an illustration of selected forms that the invention can take and not as a definition of the invention. It is only the following claims, including all equivalents, that are intended to define the scope of this invention.

What is claimed is:

1. A method of operation of a device configured to receive power from a host device, the method performed by the device comprising:
   receiving a communication via a device communication interface, the communication including information;
   responsive to a command from the host device to perform an operation, determining based on the information whether or not to perform the operation, wherein the information indicates host capabilities to supply the device with power for performing the operation;
   in response to determining to perform the operation:
      performing the operation;
      modifying the information, the modified information reflecting power used in the performance of the operation;
      sending the modified information to the host device or other device powered by the host device; and
   in response to determining not to perform the operation in the command:
      sending the information to the host device or the other device.

2. The method of claim 1, wherein the communication includes the command to perform the operation; and
   wherein determining whether to perform the operation comprises analyzing the information in the communication and how much resources the device requires to perform the operation.

3. The method of claim 2, wherein if the resources required by the device to perform the operation is greater than the host device capabilities, then the device determines to not perform the operation.

4. The method of claim 1, wherein the operation of the device comprises initialization; and
   wherein determining whether to perform the operation comprises determining whether to initialize.

5. The method of claim 1, wherein the communication is issued by the host device;
   wherein the host device, the device and the other device are configured in a ring topology; and
   wherein the device sends the modified information to the other device via the ring topology.

6. The method of claim 1, wherein the modified information is indicative to the other device of a remaining power capability for supply by the host device to the other device.

7. The method of claim 6, further comprising:
   ending the operation; and
   modifying the modified information in order to indicate to the other device the remaining power capability for supply by the host device to the other device after ending the operation.

8. The method of claim 1, wherein the information is indicative of power or electrical current availability; and
   wherein modifying the information indicative of the host device capabilities comprises subtracting from the information an amount of power or an amount of current used by the device to perform the operation.

9. The method of claim 1, wherein the information is indicative of a number of devices; and
   wherein modifying the information indicative of the host device capabilities comprises changing the number of devices.

10. The method of claim 9, wherein the host device and one or more devices receiving power from the host device comprise a system;
    wherein the number of devices is indicative of a total number of devices currently performing the operation in the system; and
    wherein in response to determining to perform the operation, the total number of devices currently performing the operation is modified to reflect that the device is performing the operation.

11. The method of claim 1, wherein the information indicative of host device capabilities comprises a current initialization capability parameter indicative of one or more devices currently initializing and a rated initialization capability parameter indicative of a number of devices that the host device is capable of initializing;
    wherein determining by the device whether to perform the operation of the device comprises comparing the rated initialization capability parameter with the current initialization capability parameter; and
    wherein, in response to determining to perform the operation, modifying the current initialization capability parameter.

12. The method of claim 1, wherein the information indicative of host device capabilities comprises one of a number of devices to perform the operation, an amount of power or an amount of current.

13. The method of claim 1, wherein the host device and one or more devices receiving power from the host device comprise a system;
    wherein the information is changeable based on current operation of at least a part of the system; and
    wherein determining whether to perform the operation in the device is based on the current operation of the at least a part of the system.

14. The method of claim 13, wherein the information is indicative of a number of devices.

15. The method of claim 14, wherein the information is indicative of a number of devices that currently may be initialized.

16. The method of claim 1, wherein the information comprises one or more parameters; and
wherein modifying the information comprises performing an arithmetic operation on at least one of the one or more parameters.

17. The method of claim 16, wherein performing the arithmetic operation on the at least one parameter comprises changing the value of the parameter by 1 in order to indicate current initialization of the device.

18. The method of claim 1, wherein determining whether or not to perform the operation is solely based on the information in the communication.

19. A device configured to receive power from a host device, the device comprising:
a device communication interface configured for communication; and
a controller in communication with the device communication interface, the controller operative to:
receive a communication via the device communication interface, the communication including information;
responsive to a command from the host device to perform an operation, determine based on the information whether or not to perform the operation, wherein the information indicates host capabilities to supply the device with power for performing the operation;
in response to determining to perform the operation:
perform the operation;
modify the information, the modified information reflecting power used in the performance of the operation; and
send the modified information to the host device or other device powered by the host device; and
in response to determining not to perform the operation in the command:
send the information to the host device or the other device.

20. The device of claim 19, wherein the communication includes the command to perform the operation; and
wherein the controller is configured to determine whether to perform the operation by analyzing the information in the communication and how much resources the device requires to perform the operation.

21. The device of claim 20, wherein if the resources required by the device to perform the operation is greater than the host device capabilities, then the controller determines not to perform the operation.

22. The device of claim 19, wherein the operation of the device comprises initialization; and
wherein the controller is configured to determine whether to perform initialization.

23. The device of claim 19, wherein the information comprises one or more parameters;
wherein the controller is configured to modify at least a part of the information by performing an arithmetic operation on at least one of the one or more parameters.

24. The device of claim 23, wherein the controller is configured to perform the arithmetic operation on the at least one parameter by changing the value of the parameter by 1 in order to indicate current initialization of the device.

25. The device of claim 19, wherein the information is indicative of power or electrical current availability; and
wherein the controller is configured to modify the information indicative of the host device capabilities by subtracting from the information an amount of power or an amount of current used by the device to perform the operation.

26. The device of claim 19, wherein the information is indicative of a number of devices; and
wherein the controller is configured to modify the information indicative of the host device capabilities by changing the number of devices.

27. The device of claim 26, wherein the host device and one or more devices receiving power from the host device comprise a system;
wherein the number of devices is indicative of a total number of devices currently performing the operation in the system; and
wherein in response to determining to perform the operation, the controller is configured to modify the total number of devices currently performing the operation to reflect that the device is performing the operation.

28. The device of claim 19, wherein the information indicative of host device capabilities comprises a current initialization capability parameter indicative of one or more devices currently initializing and a rated initialization capability parameter indicative of a number of devices that the host device is capable of initializing;
wherein the controller is configured to determine whether to perform the operation of the device by comparing the rated initialization capability parameter with the current initialization capability parameter; and
wherein, in response to determining to perform the operation, the controller is configured to modify the current initialization capability parameter.

29. The device of claim 19, wherein the information indicative of host device capabilities comprises one of a number of devices to perform the operation, an amount of power or an amount of current.

30. The device of claim 19, wherein the host device and one or more devices receiving power from the host device comprise a system;
wherein the information is changeable based on current operation of at least a part of the system; and
wherein the controller is configured to determine whether to perform the operation in the device based on the current operation of the at least a part of the system.

31. The device of claim 30, wherein the information is indicative of a number of devices.

32. The device of claim 31, wherein the information is indicative of a number of devices that currently may be initialized.

33. The device of claim 19, wherein the controller is configured to determine whether or not to perform the operation solely based on the information in the communication.

* * * * *